United States Patent
Lambert et al.

(10) Patent No.: US 12,298,523 B2
(45) Date of Patent: May 13, 2025

(54) HEAD-UP DISPLAY WITH AUTOMATIC SEAT-HEIGHT ADJUSTMENT

(71) Applicant: Panasonic Automotive Systems Company of America, Division of Panasonic Corporation of North America, Peachtree City, GA (US)

(72) Inventors: David Kay Lambert, Sterling Heights, MI (US); Fidelis Itsede, Acworth, GA (US); Patrick M. O'Connell, Novi, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 570 days.

(21) Appl. No.: 17/522,989

(22) Filed: Nov. 10, 2021

(65) Prior Publication Data

US 2022/0155605 A1     May 19, 2022

Related U.S. Application Data

(60) Provisional application No. 63/113,365, filed on Nov. 13, 2020.

(51) Int. Cl.
   *G02B 27/01*     (2006.01)
   *B60K 35/00*     (2024.01)
   (Continued)

(52) U.S. Cl.
   CPC .......... *G02B 27/0179* (2013.01); *B60K 35/00* (2013.01); *B60N 2/0274* (2023.08);
   (Continued)

(58) Field of Classification Search
   None
   See application file for complete search history.

(56) References Cited

U.S. PATENT DOCUMENTS

| | | | |
|---|---|---|---|
| 8,982,471 B1* | 3/2015 | Starner | G02B 27/0172 359/13 |
| 2017/0050542 A1* | 2/2017 | Shigeta | B60N 2/16 |

(Continued)

FOREIGN PATENT DOCUMENTS

WO     WO2014005972 A1 *     1/2014     ............. B60K 35/00

*Primary Examiner* — Peter D Nolan
*Assistant Examiner* — Laura E Linhardt
(74) *Attorney, Agent, or Firm* — Laurence S. Roach, Esq.

(57) ABSTRACT

A head up display arrangement for a motor vehicle includes a head up display producing a virtual image that is visible to a driver of the motor vehicle when he is sitting in a driver's seat and his eyes are above a first vertical level and below a second vertical level. An eye tracking system detects a vertical level of the eyes of the driver and transmits a height signal indicative of the detected vertical level of the eyes of the driver. A motorized seat height adjustment module adjusts a vertical level of the driver's seat. An electronic controller is communicatively coupled to the eye tracking system and to the motorized seat height adjustment module. The electronic controller controls the motorized seat height adjustment module based on the height signal to move the driver's eyes to a vertical position above the first vertical level and below the second vertical level.

14 Claims, 2 Drawing Sheets

(51) Int. Cl.
*B60K 35/23* (2024.01)
*B60N 2/02* (2006.01)
*B60R 16/037* (2006.01)

(52) U.S. Cl.
CPC ........ *B60R 16/037* (2013.01); *G02B 27/0101* (2013.01); *B60K 35/23* (2024.01); *B60N 2/0268* (2023.08); *G02B 2027/0187* (2013.01)

(56) References Cited

U.S. PATENT DOCUMENTS

2021/0221258 A1\* 7/2021 Ekchian ................. B60N 2/767
2023/0362495 A1\* 11/2023 Ozawa ................... B60K 35/23

\* cited by examiner

HEAD-UP DISPLAY WITH AUTOMATIC SEAT-HEIGHT ADJUSTMENT

CROSS-REFERENCED TO RELATED APPLICATIONS

This application claims benefit of U.S. Provisional Application No. 63/113,365, filed on Nov. 13, 2020, the disclosure of which is hereby incorporated by reference in its entirety for all purposes.

BACKGROUND OF THE INVENTION

1. Field of the Invention

The present invention relates to a head up display (HUD) of a motor vehicle.

2. Description of the Related Art

A head up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

A HUD eyebox is the area in a vertical plane, perpendicular to the axis of the vehicle, from which the complete virtual image from the HUD can be seen. It is known prior art for a HUD to be designed so that a large portion of the population can see the virtual image by rotating a mirror in the HUD. However, as the mirror rotates, the virtual image moves vertically. For a HUD intended to produce a virtual image used for augmented reality (AR)—so the virtual objects displayed have a fixed orientation relative to objects in the real-world—it may be better for the mirror to remain fixed. For such a HUD, with the current state of the art, the height of the eyebox must be sufficient to include most of the height range of the population. The increased height of the ray bundle needed to accommodate most of the population limits the minimum vertical height of the HUD. The increased vertical height of the HUD package that results is difficult to package under the dash of the vehicle and makes it difficult for a vehicle manufacturer to include an AR HUD in a new vehicle. With the conventional approach, an AR HUD with a useful field-of-view will not fit in the available space in the vehicle.

The current method to allow almost the entire height range of drivers (typically 95% to 99%) to be able to see the virtual image from an automotive HUD is to include a rotating mirror in the HUD. The driver is given a control that allows them to rotate the mirror and change the apparent vertical position of the virtual image. In HUDs that do not include a rotating mirror, the mirror must be tall enough to accommodate a wide range of driver heights.

Another problem is that an AR HUD may not show any information most of the time, so if the driver is outside of the eyebox, they would not know when there is information being displayed that they cannot see. Consequently, when important information is displayed, the driver is unable to see the information and does not even know that he is missing the information.

SUMMARY OF THE INVENTION

The present invention may provide a head-up display (HUD) that uses an eye-tracking system (ETS) to automatically position the driver at the correct height to see the HUD virtual image by automatically changing the seat elevation.

The invention comprises, in one form thereof, a head up display arrangement for a motor vehicle, including a head up display producing a virtual image that is visible to a driver of the motor vehicle when he is sitting in a driver's seat and his eyes are above a first vertical level and below a second vertical level. An eye tracking system detects a vertical level of the eyes of the driver and transmits a height signal indicative of the detected vertical level of the eyes of the driver. A motorized seat height adjustment module adjusts a vertical level of the driver's seat. An electronic controller is communicatively coupled to the eye tracking system and to the motorized seat height adjustment module. The electronic controller receives the height signal from the eye tracking system, and controls the motorized seat height adjustment module based on the height signal to move the driver's eyes to a vertical position above the first vertical level and below the second vertical level.

The invention comprises, in another form thereof, a method of operating a head up display in a motor vehicle, including producing a light field, and positioning a mirror to reflect the light field such that the light field is again reflected by a windshield of the motor vehicle and is then visible to a human driver of the motor vehicle as a virtual image when the human driver is sitting in a driver's seat and his eyes are above a first vertical level and below a second vertical level. A vertical level of the eyes of the driver is detected. The driver's seat is automatically moved in a vertical direction dependent upon the detected vertical level of the eyes of the driver to thereby move the driver's eyes to a vertical position above the first vertical level and below the second vertical level.

The invention comprises, in yet another form thereof, a head up display arrangement for a motor vehicle, including a head up display producing a virtual image that is visible to a driver of the motor vehicle when he is sitting in a driver's seat and his eyes are above a first vertical level and below a second vertical level. Detecting means detects a vertical level of the eyes of the driver. A seat height adjustment module adjusts a vertical level of the driver's seat. An electronic controller is communicatively coupled to the detecting means and to the seat height adjustment module. The electronic controller controls the seat height adjustment module based on the detected vertical level of the eyes of the driver to move the driver's eyes to a vertical position above the first vertical level and below the second vertical level.

An advantage of the invention is that it enables a wider range of vehicles to include an AR HUD.

Another advantage of the invention is that it reduces the vertical height needed for a HUD, especially for an augmented reality (AR) HUD.

Yet another advantage of the invention is that it may enable a reduction in the vertical height of the eyebox, and thereby improve the quality of the optimized HUD image, as well as reduce the vertical height of the optical elements in the HUD.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
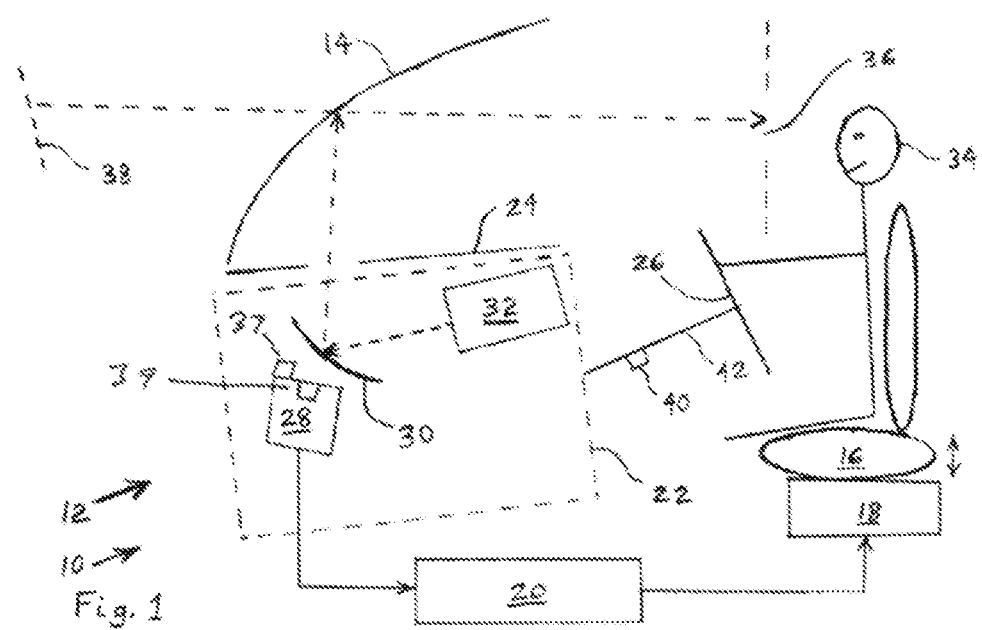
FIG. 1 is a schematic diagram of one embodiment of a head up display arrangement of the present invention.

FIG. 1 illustrates one embodiment of a head up display arrangement 10 of the present invention. Arrangement 10 is implemented in a motor vehicle 12 and includes a windshield 14, a driver's seat 16, a motorized seat height adjustment module 18, an electronic controller 20, a head up display (HUD) 22, a dashboard 24, and a steering wheel 26. HUD 22 includes an eye tracking system (ETS) 28, a mirror 30, and a picture generation unit (PGU) 32.

Arrangement 10 may adjust the height of seat 16 so the eyes of a driver 34 are positioned vertically in an imaginary HUD eyebox 36. HUD 22 includes picture generation unit (PGU) 32 and an optical system (e.g., mirror 30) to reflect light from vehicle windshield 14 so driver 34 sees a virtual image 38 outside vehicle 12. Eye tracking system (ETS) 28 in head-up display (HUD) 22 determines the current vertical position of the driver's eyes. Controller 20 commands the motorized seat height adjustment module 18 to move driver 34 vertically so their eyes are in HUD eyebox 36.

ETS 28 may use infrared (IR) illuminators 37 and an IR camera 39 that are integrated into automotive windshield HUD 22. ETS 28 may provide an indication or measurement of the height or vertical level of the mid-point between the driver's eyes. The seat 16 that the driver 34 sits on uses a motorized mechanism 18 to move the driver 34 in the vertical direction. When the driver 34 enters the vehicle, arrangement 10 moves the driver 34 vertically so the midpoint between their eyes is positioned in eyebox 36.

Currently, many high-end vehicle models already have motorized seats, with an associated memory adjust feature. Thus, this invention may be implemented in such a vehicle by using the existing motorized seat hardware.

In another embodiment, another system is used to monitor driver eye position instead of an ETS integrated into the HUD. For example, a driver monitoring system (DMS) is already present in some vehicles and may be used to detect the position of the driver's eyes.

In yet another embodiment, means is provided for the driver to see the perimeter of the eyebox, and means is provided for the driver to change his seat height manually until his eyes are within the eyebox. The driver does not need to see the entire perimeter—just enough of the perimeter of the eyebox to ensure they are able to see the entire image.

In still another embodiment, a means is provided to show a light to the driver that appears to come from beyond the apparent outside of the virtual image. The light helps the driver see where to position their head to see the virtual image. In one embodiment, an area inside the HUD package is illuminated. In a second embodiment, an area of the dash outside of the opening to the HUD is illuminated.

In a further embodiment, the motion of the seat is constrained to ensure that the driver's comfort is not affected by the seat movement. The constraints may include the distance of travel, the size of openings, magnitude of forces, and the weight of the driver as measured by a sensor in the seat. It may be ensured by the constraints that the motorized seat cannot force the driver's legs against the bottom of the steering wheel and cause an injury. In an embodiment, a sensor 40 in the steering wheel 42 column monitors the upward force on the steering wheel column. If the measured force exceeds a pre-set limit, the motorized seat is constrained to stop moving in the upward direction.

Figure 2:
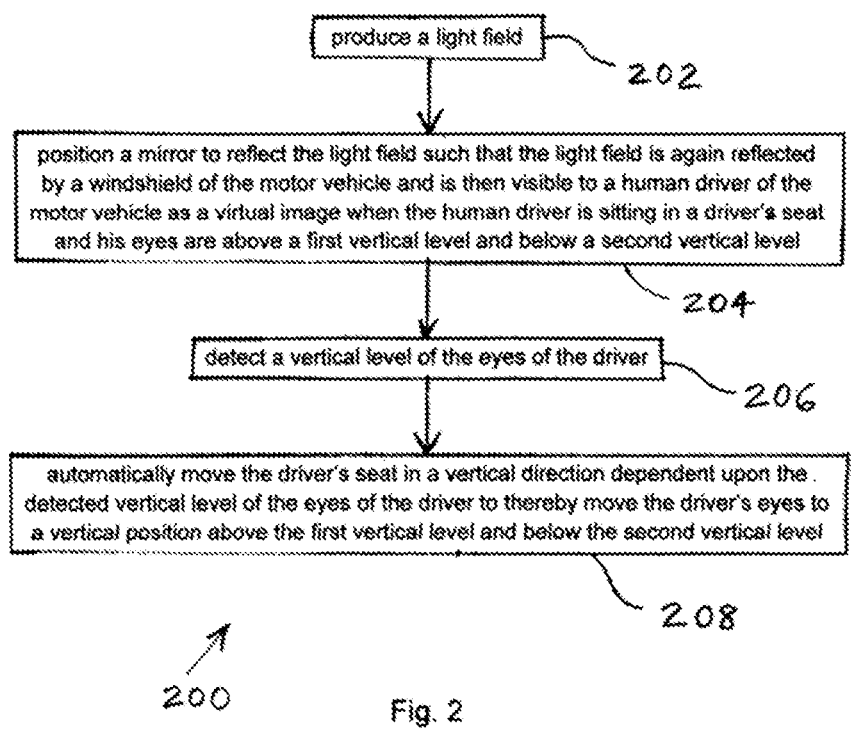
FIG. 2 is a flow chart of one embodiment of a method of the present invention for operating a head up display in a motor vehicle.

FIG. 2 illustrates one embodiment of a method 200 of the present invention for operating a head up display in a motor vehicle. In a first step 202, a light field is produced. For example, PGU 32 may produce a light field.

Next, in step 204, a mirror is positioned to reflect the light field such that the light field is again reflected by a windshield of the motor vehicle and is then visible to a human driver of the motor vehicle as a virtual image when the human driver is sitting in a driver's seat and his eyes are above a first vertical level and below a second vertical level. For example, mirror 30 may reflect light from vehicle windshield 14 so driver 34 sees a virtual image 38 when driver 34 is sitting in seat 16 and his eyes are positioned vertically in HUD eyebox 36.

In a next step 206, a vertical level of the eyes of the driver is detected. For example, ETS 28 may determine the current vertical position of the driver's eyes.

In a final step 208, the driver's seat is automatically moved in a vertical direction dependent upon the detected vertical level of the eyes of the driver to thereby move the driver's eyes to a vertical position above the first vertical level and below the second vertical level. For example, controller 20 may command the motorized seat height adjustment module 18 to move driver 34 vertically, dependent upon the detected position of the eyes of driver 34, so their eyes are in HUD eyebox 36.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A head up display arrangement for a motor vehicle, comprising:
   a head up display configured to produce a virtual image that is visible to a driver of the motor vehicle when he is sitting in a driver's seat and his eyes are above a first vertical level and below a second vertical level;
   an eye tracking system configured to detect a vertical level of a mid-point between the eyes of the driver and transmit a height signal indicative of the detected vertical level of the mid-point between the eyes of the driver;

a motorized seat height adjustment module configured to adjust a vertical level of the driver's seat;

an electronic controller communicatively coupled to the eye tracking system and to the motorized seat height adjustment module, the electronic processor being configured to:
receive the height signal from the eye tracking system; and control the motorized seat height adjustment module based on the height signal to move the driver's eyes to a vertical position above the first vertical level and below the second vertical level; and a sensor configured to detect a magnitude of upward force on a steering column of the motor vehicle, the sensor being communicatively coupled to the electronic controller, the electronic controller being configured to control the motorized seat height adjustment module based on a signal from the sensor so that the magnitude of the upward force on the steering column is limited.

2. The head up display arrangement of claim 1, wherein the head up display is configured to produce a virtual image that is visible to a driver of the motor vehicle when he is sitting in a driver's seat and his eyes are in an imaginary eyebox.

3. The head up display arrangement of claim 1, wherein the eye tracking system includes infrared (IR) illuminators and an IR camera.

4. The head up display arrangement of claim 1, wherein the head up display is configured to produce the virtual image by emitting a light field from a picture generation unit.

5. The head up display arrangement of claim 4, wherein the head up display is configured to produce the virtual image by reflecting the light field off of a mirror and toward a windshield of the motor vehicle.

6. A method of operating a head up display in a motor vehicle, the method comprising:
producing a light field;
positioning a mirror to reflect the light field such that the light field is again reflected by a windshield of the motor vehicle and is then visible to a human driver of the motor vehicle as a virtual image when the human driver is sitting in a driver's seat and his eyes are above a first vertical level and below a second vertical level;
detecting a vertical level of the eyes of the driver;
automatically moving the driver's seat in a vertical direction dependent upon the detected vertical level of the eyes of the driver to thereby move the driver's eyes to a vertical position above the first vertical level and below the second vertical level; and
detecting a magnitude of upward force on a steering column of the motor vehicle, the automatic moving of the driver's seat being based on the detected magnitude of upward force such that the magnitude of the upward force is maintained below a threshold value.

7. The method of claim 6, wherein the positioning step includes positioning a mirror to reflect the light field such that the light field is again reflected by a windshield of the motor vehicle and is then visible to a human driver of the motor vehicle as a virtual image when the human driver is sitting in a driver's seat and his eyes are in an imaginary eyebox.

8. The method of claim 6, wherein the detecting step is performed using a plurality of infrared (IR) illuminators and an IR camera.

9. The method of claim 6, wherein the detecting step includes detecting a vertical level of a mid-point between the eyes of the driver.

10. The method of claim 6, wherein the light field is produced by a picture generation unit.

11. A head up display arrangement for a motor vehicle, comprising:
a head up display configured to produce a virtual image that is by emitting a light field from a picture generation unit such that the light field is reflected off of a mirror and toward a windshield of the motor vehicle and such that the virtual image is visible to a driver of the motor vehicle when he is sitting in a driver's seat and his eyes are above a first vertical level and below a second vertical level;
means for detecting a vertical level of the eyes of the driver;
a seat height adjustment module configured to adjust a vertical level of the driver's seat;
an electronic controller communicatively coupled to the detecting means and to the seat height adjustment module, the electronic controller being configured to control the seat height adjustment module based on the detected vertical level of the eyes of the driver to move the driver's eyes to a vertical position above the first vertical level and below the second vertical level; and
a sensor configured to detect a magnitude of upward force on a steering column of the motor vehicle, the sensor being communicatively coupled to the electronic controller, the electronic controller being configured to control the motorized seat height adjustment module based on a signal from the sensor so that the magnitude of the upward force on the steering column does not exceed a threshold value.

12. The head up display arrangement of claim 11, wherein the head up display is configured to produce a virtual image that is visible to a driver of the motor vehicle when he is sitting in a driver's seat and his eyes are in an imaginary eyebox.

13. The head up display arrangement of claim 11, wherein the detecting means includes infrared (IR) illuminators and an IR camera.

14. The head up display arrangement of claim 11, wherein the detecting means is for detecting a vertical level of a mid-point between the eyes of the driver.

* * * * *